United States Patent
Kloberdans et al.

(10) Patent No.: US 9,357,075 B1
(45) Date of Patent: May 31, 2016

(54) CONFERENCE CALL QUALITY VIA A CONNECTION-TESTING PHASE

(75) Inventors: Michael Kloberdans, Brighton, CO (US); Wing Lo, Plano, TX (US); Richard Szajdecki, Jackson, NJ (US)

(73) Assignee: Avaya Inc., Basking Ridge, NJ (US)

(*) Notice: Subject to any disclaimer, the term of this patent is extended or adjusted under 35 U.S.C. 154(b) by 1779 days.

(21) Appl. No.: 12/133,533

(22) Filed: Jun. 5, 2008

(51) Int. Cl.
*H04M 3/42* (2006.01)
*H04M 3/56* (2006.01)

(52) U.S. Cl.
CPC ............ *H04M 3/56* (2013.01); *H04M 3/568* (2013.01); *H04M 2203/5027* (2013.01)

(58) Field of Classification Search
CPC ............ H04M 3/56; H04M 3/568; H04M 2203/5027; H04M 9/082
USPC ............ 370/260, 261, 262, 263; 379/202.01, 379/203.01, 204.01
See application file for complete search history.

(56) References Cited

U.S. PATENT DOCUMENTS

| | | | |
|---|---|---|---|
| 5,724,416 A | 3/1998 | Foladare et al. | |
| 6,665,402 B1 * | 12/2003 | Yue et al. | 379/406.04 |
| 6,727,767 B2 | 4/2004 | Takada | |
| 6,839,417 B2 * | 1/2005 | Weisman et al. | 379/204.01 |
| 7,165,035 B2 | 1/2007 | Zinser et al. | |
| 7,738,643 B1 * | 6/2010 | Garrison et al. | 379/203.01 |
| 8,238,548 B2 * | 8/2012 | Frauenthal et al. | 379/406.16 |
| 2006/0023061 A1 * | 2/2006 | Vaszary et al. | 348/14.08 |
| 2006/0109786 A1 * | 5/2006 | Abdel-Kader et al. | 370/232 |
| 2006/0126538 A1 * | 6/2006 | Krstulich | 370/260 |
| 2007/0168195 A1 | 7/2007 | Wilkin et al. | |
| 2007/0172083 A1 | 7/2007 | Tseng et al. | |

FOREIGN PATENT DOCUMENTS

CA 2319655 6/2001

OTHER PUBLICATIONS

3COM, 3Com IP Conferencing and Presence Modules, Dec. 2006, pp. 1-2, http:/www.3com.com/voip.
Ditech Networks, Conferencing Voice Quality and Echo Cancellation, (undated), pp. 1-4, http:/www.ditechcom.com/solutions/solutionsdetail.aspx?pid=44.
Indosoft Inc., Teleconferencing Bridge Features, 2005, pp. 1-6, http://www.indosoft.ca/features.htm.
Global IP Solutions, Backgrounder, (undated), pp. 2-6, http://www.gipscorp.com/default/backgrounder.html.
NEC America, Conference Bridge Solution for the Electra Elite IPK/IPK II, Jan. 2006, pp. 1-2.
NEC Infrontia Inc., Aspire Conference Bridge Data Sheet, 2007, pp. 1-2, http://www.necaspire.com/necaspire/conference_bridge/conference_bridge.php.
Iwatsu Voice Networks, News: Iwatsu Announces the Release of the IX-CNFBOX-1 Eight-Party Conference Bridge for ADIX, Feb. 26, 1998, pp. 1, http://ivoicenetworks.com/News/pr-cfnb.html.

(Continued)

*Primary Examiner* — Nafiz E Hoque

(57) ABSTRACT

Before a party is admitted into a conference call, the party's communication connection to the conference bridge is tested for quality. If the quality is acceptable, the party is admitted into the conference. If the quality is not acceptable, an attempt is made to improve the quality. If the attempt fails, the party is given the choice of either hanging up and calling back or being admitted into the conference in a restricted mode that limits the adverse effects of the poor connection on the conference.

15 Claims, 2 Drawing Sheets

(56) References Cited

OTHER PUBLICATIONS

Chelston Call Systems, How Audio Conferencing Can Benefit Your Organisation, Jan. 2, 2008, pp. 1-3, http://www.chelston.co.uk/Welcome/Pages/Products/Audio-Conferencing.htm.

TMCNET, Aastra selects Octasic OCT6100 device for CNX Conference Bridge Appliance, Mar. 8, 2005, pp. 1-2, http://www.tmcnet.com/scripts/print-page.aspx?PagePrint=http%3a%2f%2fwww.tmcnet.com%2fusubmit.

Skype Journal, High Definition Voice: Bringing Skype's High Bandwidth Audio to Conference Calls, Oct. 23, 2007, pp. 1-5, http://skypejournal.com/blog/2007/10/high_definition_voice_bringing.html.

Polycom Inc., Polycom VoicePlus, Full featured PSTN and VoIP conferencing, 2003, pp. 1-2.

Thomasnet (ShoreTel Extends Portfolio of Collaboration Solutions with SIP-Enabled ShoreTel IP 8000 Conference Phone, Jul. 17, 2007, pp. 1-2, http://news.thomasnet.com/printready.html?prid=525606.

\* cited by examiner

CONFERENCE CALL QUALITY VIA A CONNECTION-TESTING PHASE

TECHNICAL FIELD

This invention relates to communications conferencing.

BACKGROUND OF THE INVENTION

The voice quality of a conference call depends on the quality of the conference bridge as well as the quality of the access lines and terminal equipment used by the participants. Often, the quality of the access lines and/or terminal equipment is the limiting factor. It is common that a poor-quality access line or terminal equipment of a single participant ruins the quality of a large multi-party call. For example, a participant calling in from a cell phone with high background noise due to a poor radio signal will inject noise into the whole conference. In another example, a participant calling in by using a speaker phone with low echo return loss can generate excessive echo for the whole conference and make it difficult for everyone else to listen or speak.

To maintain the quality of a conference call, various mechanisms have been put in place at conference bridges. Conference bridges usually include echo cancellers to cancel the echo returning from each individual port. Conference bridges often implement a volume-threshold which a participant's line volume-level must exceed before their signal is mixed into the conference's output audio stream. This mechanism is used to prevent the addition to the conference output stream of a large number of sources of background noise that would raise the conference's background noise level. Most conference bridges also implement some automatic gain control (AGC) mechanism to equalize the differences in levels between different participants.

These methods are usually applied to all ports of a conference call by static provisioning. Different processing parameters may also be administered for different port types or port groups, but once they are assigned, the processing parameters and strategies do not change with the particular conditions of individual legs of the conference call. While the processing algorithms are adaptive in nature (e.g., an echo canceller may adjust the cancellation-function's coefficient or an AGC may change the gain as the call progress), they do not exploit the full range of options of different strategies, such as, for example, choosing between linear echo-cancellation and half-duplex echo-suppression.

SUMMARY OF THE INVENTION

According to an aspect of the invention, before a party is admitted into a conference call, the party's connection (communication path to the conference bridge) is tested for quality. If the quality is acceptable, the party is admitted into the conference conventionally. If the quality is not acceptable, one or more attempts are made to improve the quality to an acceptable level. If the attempt succeeds, the party is admitted into the conference. If the attempt fails, the party is either not admitted into the conference (e.g., the party is asked to hang up and call again) or the party is admitted into the conference in a restricted mode that limits the adverse effect of the connection on the conference.

The goal and effect is to prevent one or more poorly-performing legs of the conference call from ruining the conference experience for all participants in the conference.

The invention may be implemented both as a method and an apparatus, as well as a computer-readable medium containing instructions which, when executed by a computer, cause the computer to perform the method.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
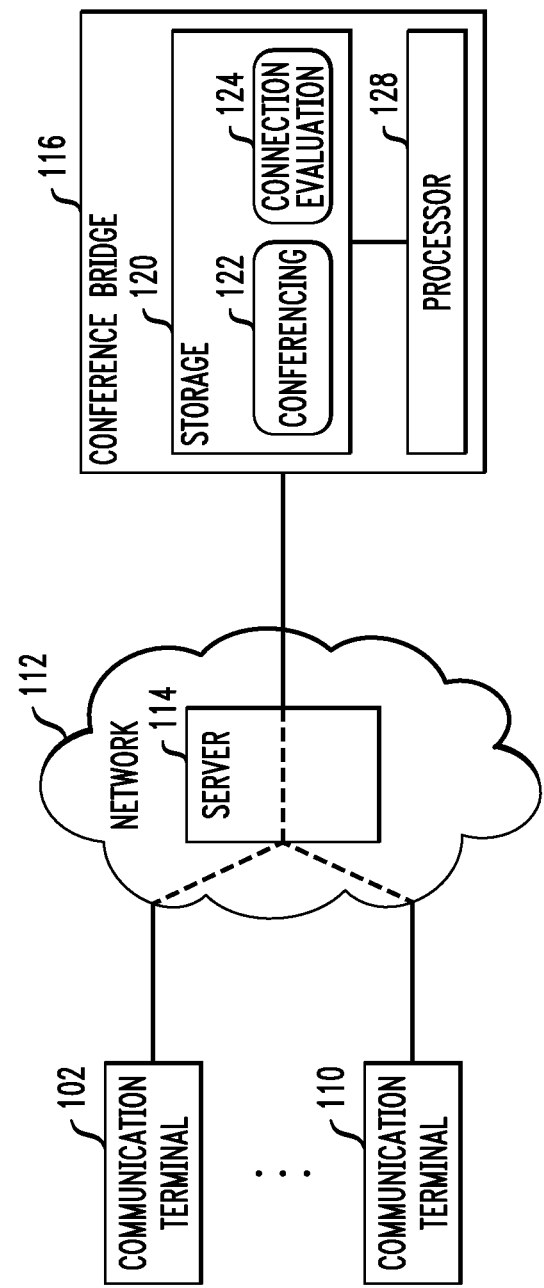
FIG. 1 is a block diagram of a communication conferencing system that includes an illustrative embodiment of the invention.

FIG. 1 shows a communication conferencing system wherein a plurality of communication terminals 102-110 are connected by a communications network 112 to a conference bridge 116. Terminals 102 comprise any desired voice-enabled user communication devices, such as wired or wireless telephones, personal digital assistants, softphones, etc. Network 112 is any desired communications network, such as a private or the public switched telephone network, a local area network, or a wide area network such as the Internet. Terminals 102-110 are usually connected to bridge 116 by a server 114 of network 112. For example, if network 112 is the private or public switched telephone network, server 114 may comprise a telephone switch. If network 112 is a data network such as a Voice over Internet Protocol (VoIP) network, server 114 may comprise a communications manager, such as the Avaya Communications Manager, for example. Conference bridge 116 is illustratively a stored-program-controlled apparatus that comprises storage 120 for storing programs such as a conferencing program 122, and a processor 128 for executing the programs. As described so far, the conferencing system of FIG. 1 is conventional.

According to an aspect of the invention, conference bridge 116 implements a connection-evaluation function 200. Function 200 is illustratively implemented by storing a connection-evaluation program 124 in storage 120 and executing program 124 by processor 128. In alternative embodiments, connection-evaluation function 200 many be implemented either by server 114 or by an adjunct processor (not shown) that supplements and assists conference bridge 116. Connection-evaluation function 200 tests each of the conference legs, i.e., the connections of each of terminals 102-110 (preferably including the terminals themselves) to conference bridge 116, before admitting the corresponding terminal 102-110 into the conference. If it determines a deficiency in a conference leg, connection-evaluation function 200 preferably attempts to correct the deficiency. If it detects no deficiency or corrects the deficiency, connection-evaluation function 200 connects the corresponding terminal 102-110 into the conference in a normal manner, i.e., without restrictions. If it cannot correct a discovered deficiency, connection-evaluation function 200 either requests the user of the corresponding terminal 102-110 to hang up and call into the conference again, or connects the corresponding terminal 102-110 into the conference in a restricted mode that tries to minimize any adverse effect that the terminal's connection may have on the conference.

Figure 2:
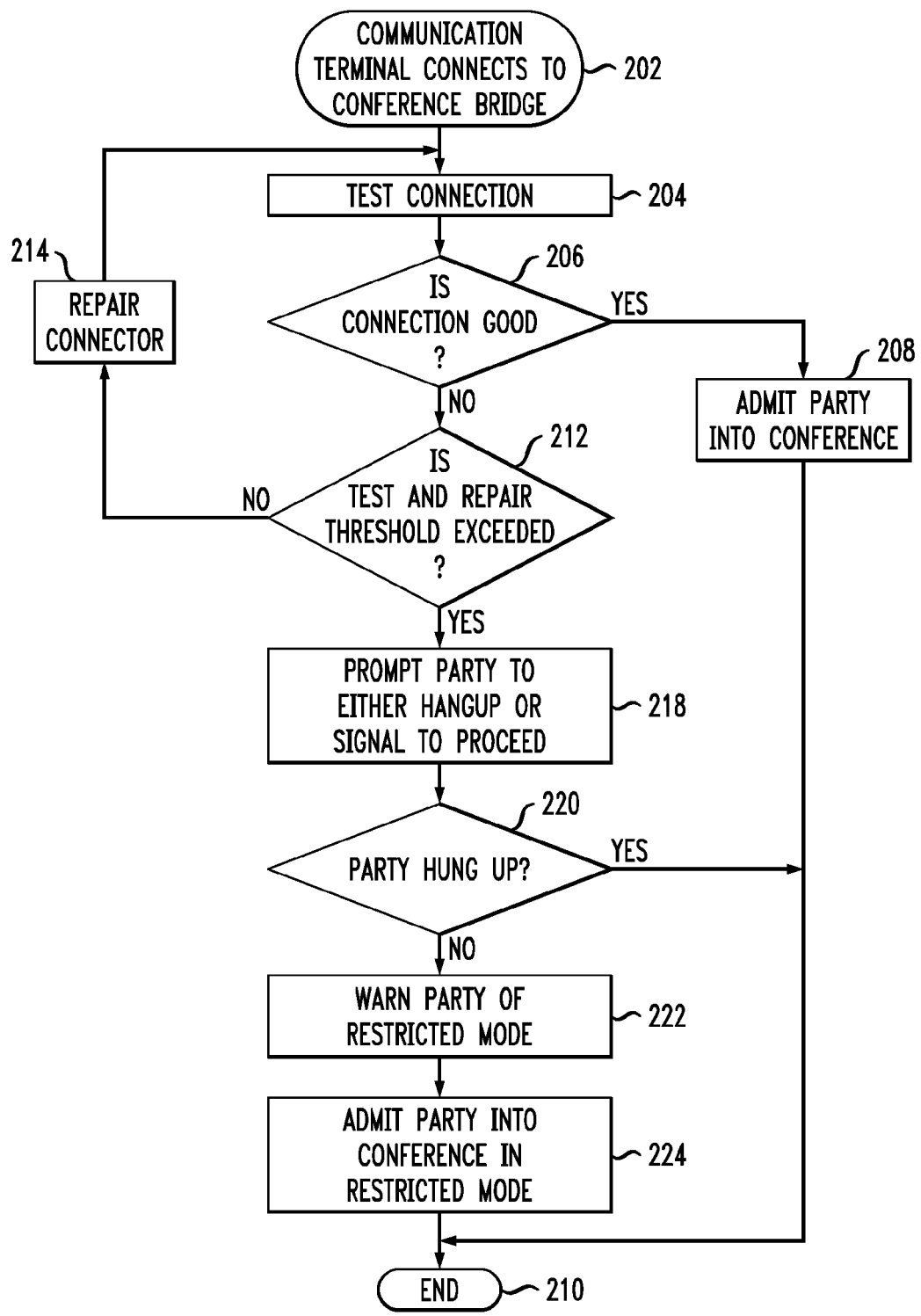
FIG. 2 is a flowchart of operation of a connection-evaluation function of the system of FIG. 1.

An illustrative embodiment of connection-evaluation function 200 is shown in FIG. 2. Function 200 is invoked when a terminal 102-110 connects to conference bridge 116 (or to server 114 if server 114 implements function 200), at step 202. In response, function 200 tests the connection, e.g., the quality of the terminal equipment and the access line, at step 204, to determine any deficiencies of the connection that could adversely impact the conference. According to one aspect of the invention, function 200 provides both passive and active means for detecting and mitigating voice quality issues. Illustratively, function 200 tests for at least the following deficiencies of the connection: excessive background noise levels, insufficient echo return loss, and varying signal levels. Initial testing is preferably transparent to the parties (i.e., the users of terminals 102-110). For example, when a terminal 102-110 connects to bridge 116, function 200 listens to the connection for a moment to determine the level of background noise on the connection. Illustratively, function 200 then plays (transmits) a welcome or entry sound on the connection and listens on the connection for the sound's echo. The sound preferably comprises tones of a plurality of different frequencies and is played at a plurality of different volumes (amplitudes) to determine if the connection is highly non-linear. Further illustratively, function 200 then plays an announcement (greeting) on the connection welcoming the party to the conference, and again listens on the connection, for the announcement's echo to determine the echo's level. The announcement may request the party to speak, e.g., their name. When the party speaks, function 200 measures the amplitude of the response, and the frequency-response and amplitude (level)-response characteristics of the line, to determine if the connection is too quiet or too loud and to determine if the connection has unacceptably-varying signal levels. It may also measure the speech signal-to-noise level of the connection to determine if it meets a threshold of acceptability. Other tests may be performed as desired in a particular environment.

1. From the results, function 200 determines if the quality of the connection is good, i.e., if it passes specified thresholds, at step 206. If it determines that connection quality is good, function 200 causes the connection to be bridged into the conference, at step 208, thereby connecting the party at the corresponding terminal 102-110 into the conference. Function 200 then ends its operation, at step 210. If it determines at step 206 that the connection quality is not good, function 200 checks its records to determine if the number of times or the time period that it has spent testing and attempting to repair deficiencies of the connection exceed a threshold, at step 212. (On the first pass through step 208, the threshold will not have been exceeded.) If the threshold is not exceeded, function 200 attempts to repair the connection, at step 214. For example, if the noise level on the connection has been determined to be too high, function 200 adjusts the noise-gate threshold on the connection. Or, if the signal level on the connection has been determined to be too low or too high, function 200 may adjust the gain of the receiver of the connection at bridge 116. The repair attempt may not be transparent to the party. For example, if it has been determined that the echo on the connection is too great, function 200 may give the echo canceler a longer time to calibrate itself, by playing another announcement on the connection. This announcement may prompt the party to speak something so that the echo in both directions of the connection can be adjusted. Or, function 200 may request the party to move closer to or further away from the microphone of terminal 102-110, or to stop using a headset or a speakerphone of terminal 102-110 (if the party is doing so) and to use the handset instead. Other repair attempts may include measuring and mitigating total delay and/or packet loss, or setting jitter buffers for each individual call, or changing a packet loss concealment algorithm to improve quality. Function 200 then returns to step 204 to retest the connection, Returning to step 212, if function 200 determines there that the number of, or time spent in, testing and repair attempts has exceeded the threshold without the determined deficiencies having been adequately diminished, function 200 prompts the party to hang up and redial the conference, at step 218, in order to establish a new connection that will hopefully not have the deficiencies. Other prompts may include system recommendations such as to use a cell phone over a VoIP system, to use a digital phone over VoIP, or to use a private system over a PSTN. At step 218, function 200 further informs the party that instead of hanging up, the party may signal, e.g., by pressing a touch-tone button on terminal 102-110, to enter the conference on the existing connection, in which case the party will be admitted to the conference in a restricted mode that minimizes the adverse effect that the deficiencies of the connection may have on the other participants of the conference. Such restricted mode may illustratively involve admitting the party into the conference in a listen-only mode, or connecting the party in a muted mode where signals from the party are admitted into the conference only when the party is speaking and the signal-to-noise ratio of the voice signals exceeds a threshold. Another example of the restricted mode is transmitting voice signals from the conference to the party at a low (quiet) level in order to limit the volume of the echo that the party's connection introduces into the conference. If the party hangs up, as determined at step 220, the connection is torn down and operation of function 200 ends, at step 210. If the party signals its intent to join the conference on its current connection, as determined at step 220, function 200 plays an announcement to the party that informs the party of the type and/or limitations of the restricted mode of its connection to the conference, at step 222. Alternatively, step 222 may be performed as a part of step 218. Function 200 then causes the party to be admitted into the conference in the restricted mode, at step 224. Operation of function 200 then ends, at step 210.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   in a processor of a conference bridge and in response to a party attempting to join a conference via a communication path between the party and the conference bridge, determining quality of the path and a signal on the path;
   in response to an acceptable said quality, connecting the path to the conference by the conference bridge;
   in response to an unacceptable said quality, attempting to improve the quality of the path and the signal, using at least one of linear echo-cancellation and half-duplex echo-suppression;
   in response to a successful said attempt, connecting the path to the conference; and
   in response to an unsuccessful said attempt, giving the party a choice of either (a) hanging up and attempting to join the conference via another communication path or (b) connecting the path to the conference in a restricted manner.

2. The method of claim 1 wherein:
determining quality of the path and signal comprises testing at least one background noise level, echo return loss, variance of signal levels, and signal-to-noise ratio.

3. The method of claim 1 wherein:
determining quality of the path and signal comprises transmitting sound on the path to the party, and listening for echo of the transmitted sound on the path.

4. The method of claim 3 wherein:
transmitting sound comprises transmitting sounds of a plurality of different frequencies at a plurality of different amplitudes.

5. The method of claim 1 wherein:
determining quality of the path and signal comprises prompting the party to speak, and in response to the party speaking, measuring at least one of amplitude of the speech, frequency-response of the path, and amplitude-response of the path.

6. The method of claim 1 wherein:
attempting to improve the quality of the path and signal comprises at least one of adjusting a noise-gate threshold on the path, adjusting a gain of a receiver on the path, and extending a time for calibration of an echo canceller on the path.

7. The method of claim 1 wherein:
attempting to improve the quality of the path and signal comprises directing the party to perform a particular act.

8. The method of claim 1 wherein:
attempting to improve the quality of the path and signal comprises making a first attempt to improve the quality of the path and signal;
re-determining the quality of the path and signal subsequently to making the first attempt;
in response to determining that the first attempt did not produce acceptable said quality, determining whether one of (a) a number of attempts at improving the quality, and (b) an amount of time spent attempting to improve the quality, exceed a threshold;
in response to determining that the threshold has not been exceeded making a second attempt to improve the quality; and
in response to determining that the threshold has been exceeded, treating the attempt as unsuccessful.

9. The method of claim 1 wherein:
connecting the path to the conference in a restricted manner comprises at least one of connecting the path to the conference in a listen-only mode, connecting the path to the conference in a muted mode, and transmitting conference signals on the path at a low volume level.

10. The method of claim 1, wherein the attempting to improve the quality of the path and signal comprises an echo canceller which is capable of adjusting the coefficient of a cancellation function.

11. A method comprising:
(a) in a processor of a conference bridge and in response to a caller calling into a conference via a communication path between the caller and the conference bridge, (i) testing at least one of background noise level, echo return loss, variance of signal levels, and signal-to-noise ratio, to determine quality of the path;
(b) in response to determining an acceptable said quality, connecting the path to the conference;
(c) in response to determining a unacceptable said quality, determining whether one of a number of attempts at improving the quality and an amount of time spent attempting to improve the quality, exceed a threshold;
(d) in response to determining that the threshold has not been exceeded, attempting to improve the quality of the path by at least one of adjusting a noise-gate threshold of the path, adjusting a gain of a receiver on the path, applying linear echo-cancellation, applying half-duplex echo-suppression, and directing the caller to perform a particular action;
(e) after step (d) returning to step (a)(i);
(f) in response to determining that the threshold has been exceeded, giving the caller a choice of either hanging up and attempting to join the conference via another communication path or connecting to the conference in a restricted mode;
(g) in response to the caller choosing to hang up, forbearing from connecting the path to the conference;
(h) in response to the caller choosing to connect to the conference in a restricted mode, at least one of connecting the path to the conference in a listen-only mode, connecting the path to the conference in a muted mode, and transmitting conference signals on the path at a low volume level, so as to lessen an adverse effect that the path would otherwise have on the conference.

12. A non-transitory computer-readable medium comprising instructions which, when executed by a computer, cause the computer to perform the method of one of claims 1-8, 9, and 11.

13. A conference bridge comprising:
a processor responsive to a party attempting to join a conference via a communication path between the party and a conference bridge, for determining quality of the path and a signal on the path, for causing the path to be connected to the conference in response to an acceptable said quality, for attempting to improve the quality of the path or the signal using at least one of linear-echo suppression and half-duplex echo-suppression in response to an unacceptable said quality, for causing the path to be connected to the conference in response to a successful said attempt, and responsive to an unsuccessful said attempt, giving the party a choice of either (a) hanging up and attempting to join the conference via another communication path or (b) connecting the path to the conference in a restricted manner.

14. The apparatus of claim 13 further comprising:
storage for storing a path evaluation program, wherein the processor is adapted to execute the path evaluation program.

15. The apparatus of claim 13 further comprising:
storage for storing a path evaluation program and a conferencing program for implementing the conference bridge, wherein the processor is adapted to execute the programs from the storage.

* * * * *